(12) United States Patent
Phillips et al.

(10) Patent No.: US 9,214,827 B2
(45) Date of Patent: Dec. 15, 2015

(54) APPARATUS AND METHOD FOR HARVESTING POWER FROM AN OVERHEAD TRANSMISSION CONDUCTOR

(71) Applicant: Electric Power Research Institute, Inc., Charlotte, NC (US)

(72) Inventors: Andrew John Phillips, Harrisburg, NC (US); Chris Engelbecht, Ede (NL); Eric Engdahl, Columbus, OH (US)

(73) Assignee: Electric Power Research Institute, Inc., Charlotte, NC (US)

(*) Notice: Subject to any disclaimer, the term of this patent is extended or adjusted under 35 U.S.C. 154(b) by 333 days.

(21) Appl. No.: 13/773,131

(22) Filed: Feb. 21, 2013

(65) Prior Publication Data

US 2013/0214736 A1  Aug. 22, 2013

Related U.S. Application Data

(60) Provisional application No. 61/601,793, filed on Feb. 22, 2012.

(51) Int. Cl.
*H02J 7/00* (2006.01)
*H02J 7/02* (2006.01)
*H02J 5/00* (2006.01)
*H02J 11/00* (2006.01)

(52) U.S. Cl.
CPC .............. *H02J 7/025* (2013.01); *H02J 5/005* (2013.01); *H02J 7/0044* (2013.01); *H02J 7/0027* (2013.01); *H02J 7/0042* (2013.01); *H02J 7/0045* (2013.01); *H02J 11/00* (2013.01); *Y02T 90/122* (2013.01); *Y02T 90/125* (2013.01); *Y02T 90/127* (2013.01); *Y02T 90/168* (2013.01)

(58) Field of Classification Search
CPC ..... H02J 7/0027; H02J 7/0042; H02J 7/0044; H02J 7/0045; H02J 7/025; Y02T 90/12; Y02T 90/122; Y02T 90/125; Y02T 90/127; Y02T 90/168
USPC .......................................... 320/107, 109, 113
See application file for complete search history.

(56) References Cited

U.S. PATENT DOCUMENTS

| | | | | |
|---|---|---|---|---|
| 3,553,692 A | * | 1/1971 | Blanchette et al. | 343/778 |
| 4,196,417 A | * | 4/1980 | Fasching et al. | 340/870.04 |
| 4,904,996 A | * | 2/1990 | Fernandes | 340/870.07 |
| 5,181,026 A | * | 1/1993 | Granville | 340/870.28 |
| 5,301,096 A | * | 4/1994 | Klontz et al. | 363/37 |
| 6,018,700 A | * | 1/2000 | Edel | 702/60 |
| 6,047,119 A | * | 4/2000 | Kappenman et al. | 703/17 |
| 6,470,283 B1 | * | 10/2002 | Edel | 702/64 |
| 6,492,897 B1 | * | 12/2002 | Mowery, Jr. | 455/522 |
| 6,494,141 B2 | * | 12/2002 | Montambault et al. | 104/112 |

(Continued)

*Primary Examiner* — Stacy Whitmore
(74) *Attorney, Agent, or Firm* — Trego, Hines & Ladenheim, PLLC

(57) ABSTRACT

An apparatus and method of harvesting power for charging batteries of a robot traversing an overhead transmission conductor is disclosed. The apparatus is adapted to harvest power from the overhead transmission conductor and provide a DC voltage for charging a battery and includes a first shield wire bonded to a structure that is grounded to the earth, a second shield wire isolated from the structure, and a charging station. The first shield wire, second shield wire, structure, and earth form a loop into which induced currents flow. The charging station is electrically connected to the second shield wire and adapted to convert induced currents flowing along the second shield wire into a DC voltage for charging a battery of the charging station.

16 Claims, 6 Drawing Sheets

(56) References Cited

U.S. PATENT DOCUMENTS

| | | | |
|---|---|---|---|
| 6,512,536 B1 * | 1/2003 | Ross | 348/61 |
| 6,950,567 B2 * | 9/2005 | Kline | 385/15 |
| 6,980,089 B1 * | 12/2005 | Kline | 375/258 |
| 7,282,944 B2 * | 10/2007 | Gunn et al. | 324/764.01 |
| 7,398,946 B1 * | 7/2008 | Marshall | 244/58 |
| 7,430,932 B2 * | 10/2008 | Mekhanoshin et al. | 73/865.9 |
| 7,552,684 B2 * | 6/2009 | Montambault et al. | 104/112 |
| 7,557,563 B2 * | 7/2009 | Gunn et al. | 324/127 |
| 7,633,262 B2 * | 12/2009 | Lindsey et al. | 320/108 |
| 7,701,325 B2 * | 4/2010 | White, II | 340/870.07 |
| 7,761,248 B2 * | 7/2010 | Doig et al. | 702/61 |
| 7,872,371 B2 * | 1/2011 | Varley et al. | 307/10.1 |
| 7,894,940 B2 * | 2/2011 | Kumhyr | 700/248 |
| 7,902,854 B2 * | 3/2011 | Gunn et al. | 324/754.01 |
| 8,063,605 B2 * | 11/2011 | Tonegawa et al. | 320/107 |
| 8,294,286 B2 * | 10/2012 | Hunter | 290/1 R |
| 8,335,062 B2 * | 12/2012 | Haines et al. | 361/42 |
| 8,476,895 B2 * | 7/2013 | Higuma et al. | 324/142 |
| 8,497,781 B2 * | 7/2013 | Engelhardt et al. | 340/870.01 |
| 8,505,461 B2 * | 8/2013 | Phillips et al. | 104/87 |
| 8,657,490 B2 * | 2/2014 | Sibilant et al. | 374/141 |
| 8,660,698 B2 * | 2/2014 | Phillips et al. | 700/259 |
| 8,666,553 B2 * | 3/2014 | Phillips et al. | 700/259 |
| 8,706,340 B2 * | 4/2014 | Zhao et al. | 701/25 |
| 8,767,071 B1 * | 7/2014 | Marshall | 348/144 |
| 8,970,176 B2 * | 3/2015 | Ballatine et al. | 320/138 |
| 2006/0114122 A1 * | 6/2006 | Jones | 340/870.07 |
| 2008/0067974 A1 * | 3/2008 | Zhang et al. | 320/104 |
| 2008/0246507 A1 * | 10/2008 | Gunn et al. | 324/771 |
| 2010/0231056 A1 * | 9/2010 | Varley et al. | 307/145 |
| 2010/0292859 A1 * | 11/2010 | Terasaki et al. | 700/295 |
| 2011/0074350 A1 * | 3/2011 | Kocher | 320/109 |
| 2011/0148353 A1 * | 6/2011 | King et al. | 320/109 |
| 2011/0192315 A1 * | 8/2011 | Phillips et al. | 104/112 |
| 2011/0196536 A1 * | 8/2011 | Phillips et al. | 700/259 |
| 2011/0234153 A1 * | 9/2011 | Abramson | 320/107 |
| 2012/0074891 A1 * | 3/2012 | Anderson et al. | 320/101 |
| 2012/0104996 A1 * | 5/2012 | Eikeland et al. | 320/107 |
| 2013/0113413 A1 * | 5/2013 | Harty | 320/101 |
| 2013/0214736 A1 * | 8/2013 | Phillips et al. | 320/108 |
| 2013/0249485 A1 * | 9/2013 | Bohm et al. | 320/109 |
| 2014/0207319 A1 * | 7/2014 | King et al. | 701/22 |

* cited by examiner

APPARATUS AND METHOD FOR HARVESTING POWER FROM AN OVERHEAD TRANSMISSION CONDUCTOR

BACKGROUND OF THE INVENTION

The present invention relates generally to an apparatus and method of harvesting power from an overhead power transmission conductor and, more particularly, to an apparatus and method of harvesting power for charging batteries of a robot traversing the overhead transmission conductor.

Robots, such as the one shown in FIG. 1, have been developed to provide inspections of overhead transmission lines. These inspections may be performed by the robots while moving along a shield wire. In the case of autonomous robots, the robots, generally, are powered by internal batteries which need to be charged regularly. Several options have been proposed for charging these batteries. For example, solar panels on the robots to collect energy from the sun, using currents flowing in the shield wire to charge the batteries (this can be implemented with the robot touching a structure when the shield wire is isolated), and attaching the robots to charging stations that are powered by 110V/220V or solar panels or shield wire induction.

All of these options have their own challenges, and often it has been found that using a charging station provides the best method for charging the batteries. However, the challenge with using charging stations is that the robot can only charge itself at the station themselves, i.e., predetermined locations. As a result, the robot is left searching for a charging station or users are required to put charging stations at a large number of locations. Neither of which is ideal.

BRIEF SUMMARY OF THE INVENTION

Accordingly, there is a need for an apparatus and method that overcomes the above limitations of battery charging by allowing the robot to charge itself at any structure using power from a charging station even if the structure itself does not have a charging station installed.

According to one aspect of the invention, an apparatus adapted to harvest power from an overhead transmission conductor and provide a DC voltage for charging a battery includes a first shield wire bonded to a structure that is grounded to the earth, a second shield wire isolated from the structure, and a charging station. The first shield wire, second shield wire, structure, and earth form a loop into which induced currents flow. The charging station is electrically connected to the second shield wire and adapted to convert induced currents flowing along the second shield wire into a DC voltage for charging a battery of the charging station.

According to another aspect of the invention, a method of harvesting power from an overhead transmission conductor includes the steps of providing an apparatus adapted to harvest power from the overhead transmission conductor having a first shield wire bonded to a grounded structure, a second shield wire isolated from the structure, and a charging station electrically connected to the second shield wire. The method further includes the steps of forming an induced current loop using the first shield wire, second shield wire, grounded structure, and earth to allow induced currents created by a magnetic field to flow therein, and using the charging station to convert the induced currents flowing through the second shield wire into a DC voltage for charging a battery of the charging station.

According to a further aspect of the invention, a method of harvesting power from an overhead transmission conductor and using the harvested power to charge a battery of an inspection device includes the steps of providing an apparatus adapted to harvest power from the overhead transmission conductor having a first shield wire bonded to a plurality of grounded structures, a second shield wire isolated from the structures, and a charging station electrically connected to the second shield wire. The method further includes the steps of forming an induced current loop using the first shield wire, second shield wire, grounded structures, and earth to allow induced currents created by a magnetic field to flow therein, using the charging station to convert the induced currents flowing through the second shield wire into a DC voltage for charging a battery of the charging station, and using the battery of the charging station to energize the second shield wire with a DC voltage for charging the battery of the inspection device.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
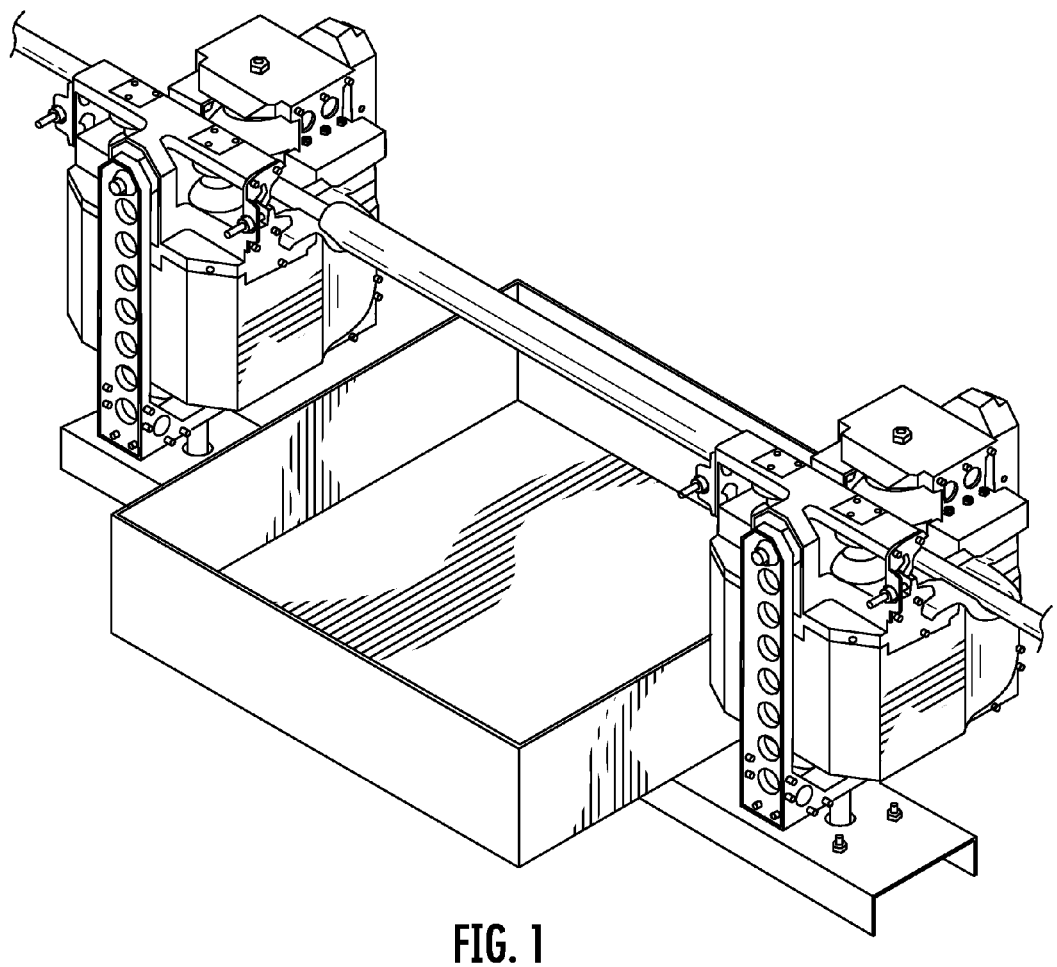
FIG. 1 illustrates an autonomous robot for traversing and inspecting overhead transmission conductors.
Figure 2:
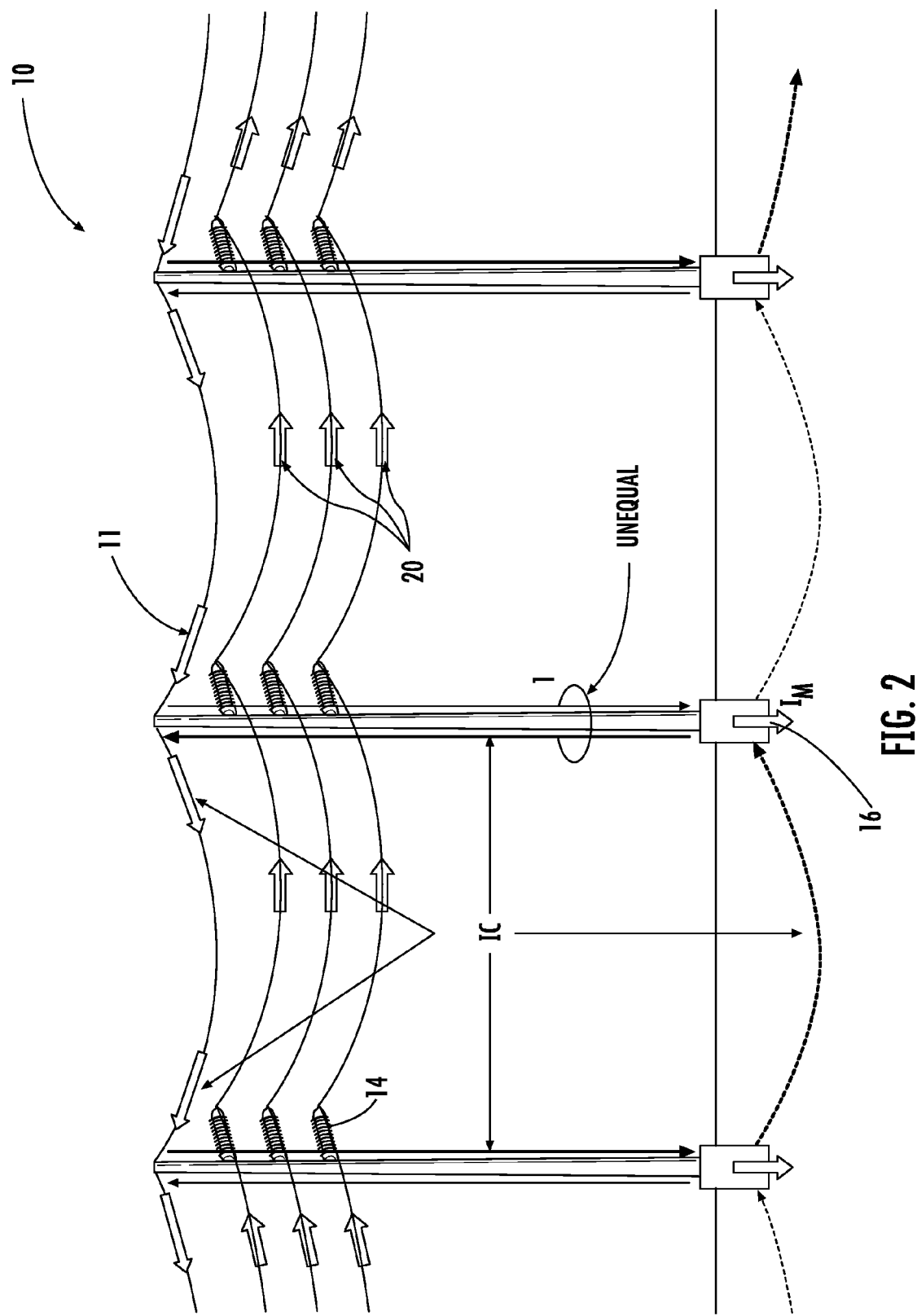
FIG. 2 shows an apparatus and method for harvesting power using inductive coupling from an overhead transmission conductor according to an embodiment of the invention.
Figure 3:
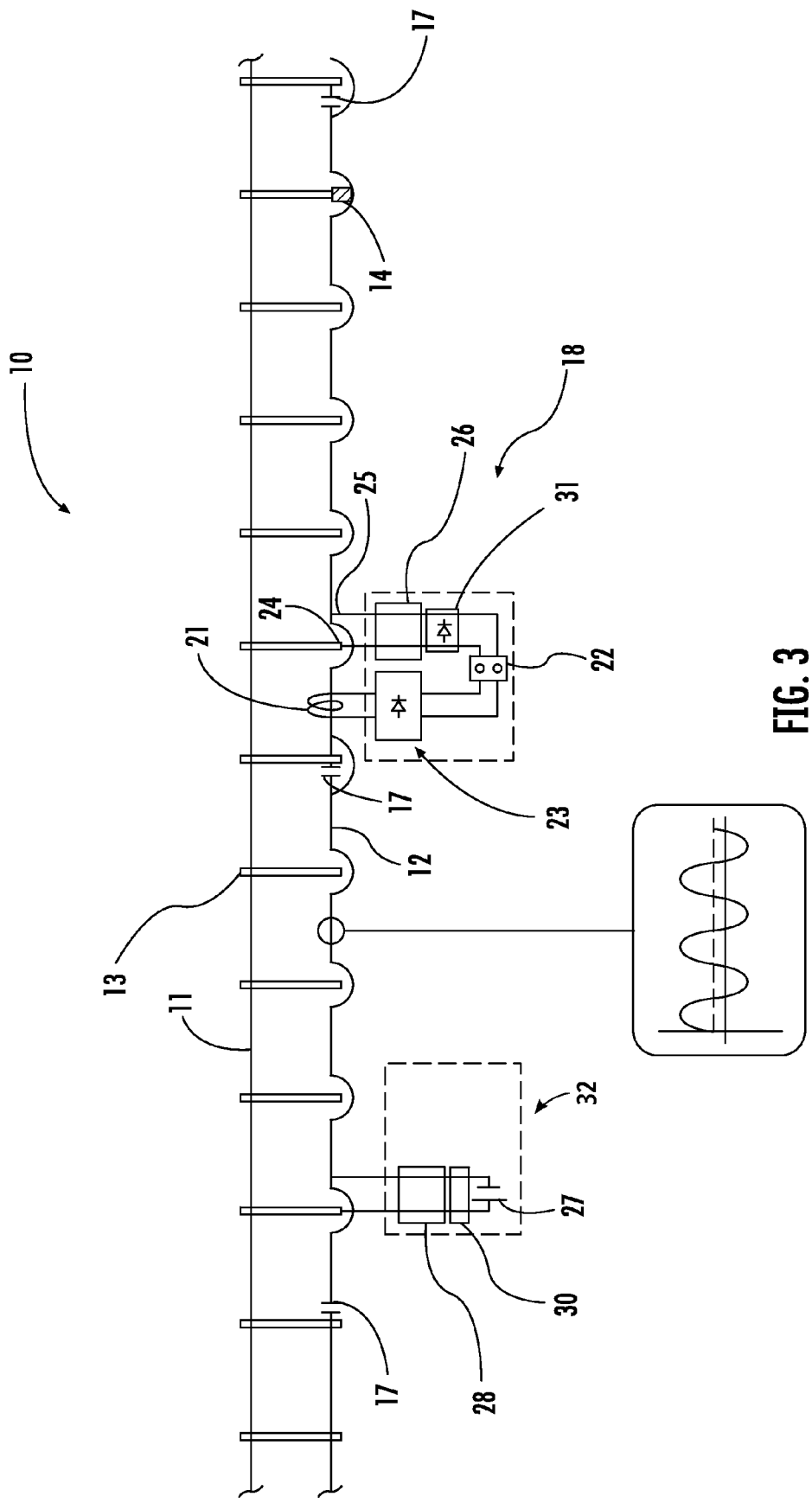
FIG. 3 is an inductive coupling diagram for harvesting power in accordance with FIG. 2.

Referring to the drawings, an exemplary apparatus and method of harvesting power from an overhead transmission conductor according to an embodiment of the invention is illustrated in FIGS. 2 and 3 and shown generally at reference numeral 10.

In general, a loop into which currents are induced (IC) from a magnetic field setup by current flowing in phase conductors 20 is formed by shield wire 11, isolated shield wire 12, structures 13, and capacitors 17. As shown, the induced current flows up and down the structures 13, through the earth, and along the shield wires. As illustrated by the weighted arrows along structures 13, an unequal current in the loops results in a net structural current.

More particularly, the transmission line will have two or more shield wires 11 and 12 attached as per normal construction. One of the shield wires 11 is bonded to each structure 13. Shield wire 11 and the structures 13 will be called "ground" since each structure 13 is connected to the earth using a ground electrode 16. The other shield wire 12 is electrically isolated from the structures 13.

A charging station 18 is placed at one location along the transmission line and is adapted to convert the induced currents into DC voltage which is used to energize the wire 12 for charging of a robot's batteries. At this location the shield wire 12 is electrically bonded to the structure 13 using a distribution class capacitor 17. As illustrated, the shield wire 12 is electrically bonded to a first terminal of capacitor 17 and a second terminal of the capacitor 17 is electrically bonded to the structure 13. At a significant distance away (normally multiple structures), the shield wire 12 is also bonded to a structure 13 using another distribution class capacitor 17 (multiple bonding points using a distribution class capacitor may be used along the wire 12, for example, every 14 spans). The distance between capacitors 17 is chosen to provide enough current for the charge station to keep its battery charged without creating electronics protection issues.

At the end of a "charging section" or "robot section" of wire 12, the wire 12 is terminated at a capacitor 17 with no jumper, as illustrated in FIG. 3, to effectively insulate the shield wire 12 for DC voltages and current. The size of the capacitor 17 is chosen to compensate for ground wire loop resulting in higher currents. For the in-between structures 13, the shield wire 12 is isolated from the structures using the insulators like insulator 14.

The grounded shield wire 11, end structures 13, isolated shield wire 12, and the end capacitors 17 form a loop into which currents are induced from the magnetic field setup by the currents flowing in phase conductors 20. The current flows through the capacitors 17 since they are of relatively low impedance at 60 Hz. The current in the shield wire 12 or the current flowing through the capacitor 17 leads is used to charge batteries 22 in the charging station 18. The DC voltage from batteries 22 are then used to energize the wire 12 with DC voltage, resulting in the shield wire 12 having an AC voltage with a DC offset. It is this DC offset that is used to charge a battery 27 of robot 32.

A Current Transformer (CT) 21 together with power electronics 23 is one implementation of getting the power from the current flowing in the shield wire 12 into the battery 22. As illustrated, the CT 21 taps into or is electrically connected to the shield wire 12. It should be appreciated that the capacitors 17 are open circuits to direct current (DC). A first terminal 24 of the battery 22 is bonded to the structure-ground 13, which in turn is bonded to the grounded shield wire 11 and hence all the other structures along the transmission line.

A 60 HZ blocking filter 26 is positioned between the charging station battery 22 at the structure 13 to prevent 60 Hz currents flowing. A diode 31 is also positioned between the filter 26 and battery 22 to prevent charging of one charging station 18 from another charging station 18 when multiple charging stations are on the wire 12. A second terminal 25 of the battery is bonded to the isolated shield wire 12. Thus, if the robot 32 bonds itself to any structure along the shield wire 12 it has access to both terminals 24 and 25 of the charging station battery 22 so that it can charge its internal battery 27.

The robot 32 includes a 60 Hz blocking filter 28 is positioned between the robot's 32 battery 27 at the structure 13 to prevent 60 Hz currents flowing and a DC converter 30 positioned between the 60 Hz filter 28 and the battery 27. The converter 30 converts the DC charging voltage at the robot from the charging station 18 to a necessary robot battery charging voltage. The DC charging voltage at the robot is less than the charging station DC voltage due to losses when the robot battery is being charged and drawing DC current. Protection including arrestors and spark-gaps are used to prevent damage to the batteries 22 and 27, capacitors 17 and power electronics 23 under lightning and fault conditions.

In the case of multiple charging stations 18 along wire 12, the distance between charging stations 18 is chosen to provide enough voltage at the robot at the desired charging current. This distance depends on the charging station battery voltage and capacity, the shield wire 12 and robot contact resistances, and the robot's DC power converter operating range.

Figure 4:
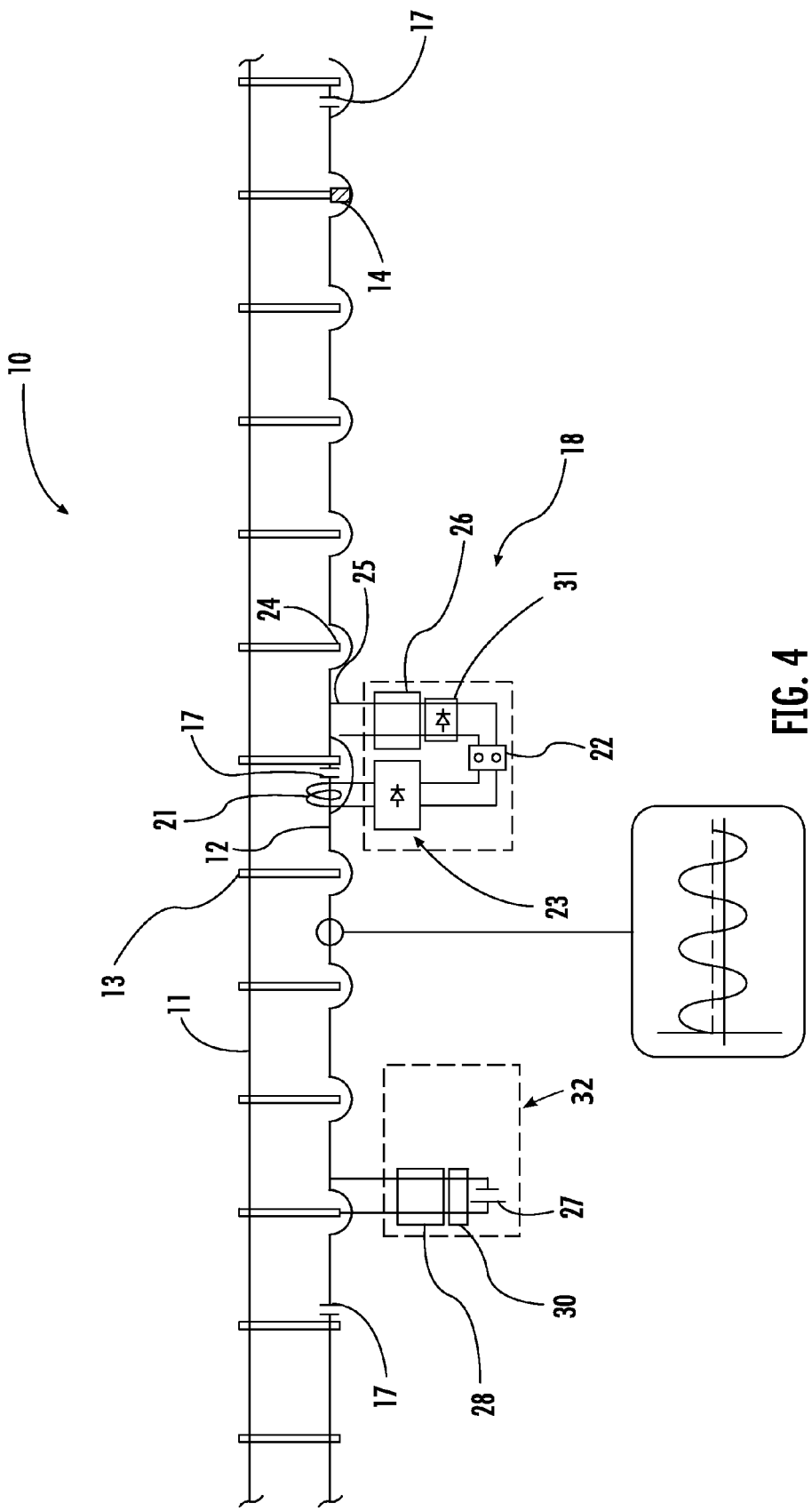
FIG. 4 is the inductive coupling diagram FIG. 3 with a charging station positioned in a different location.
Figure 5:
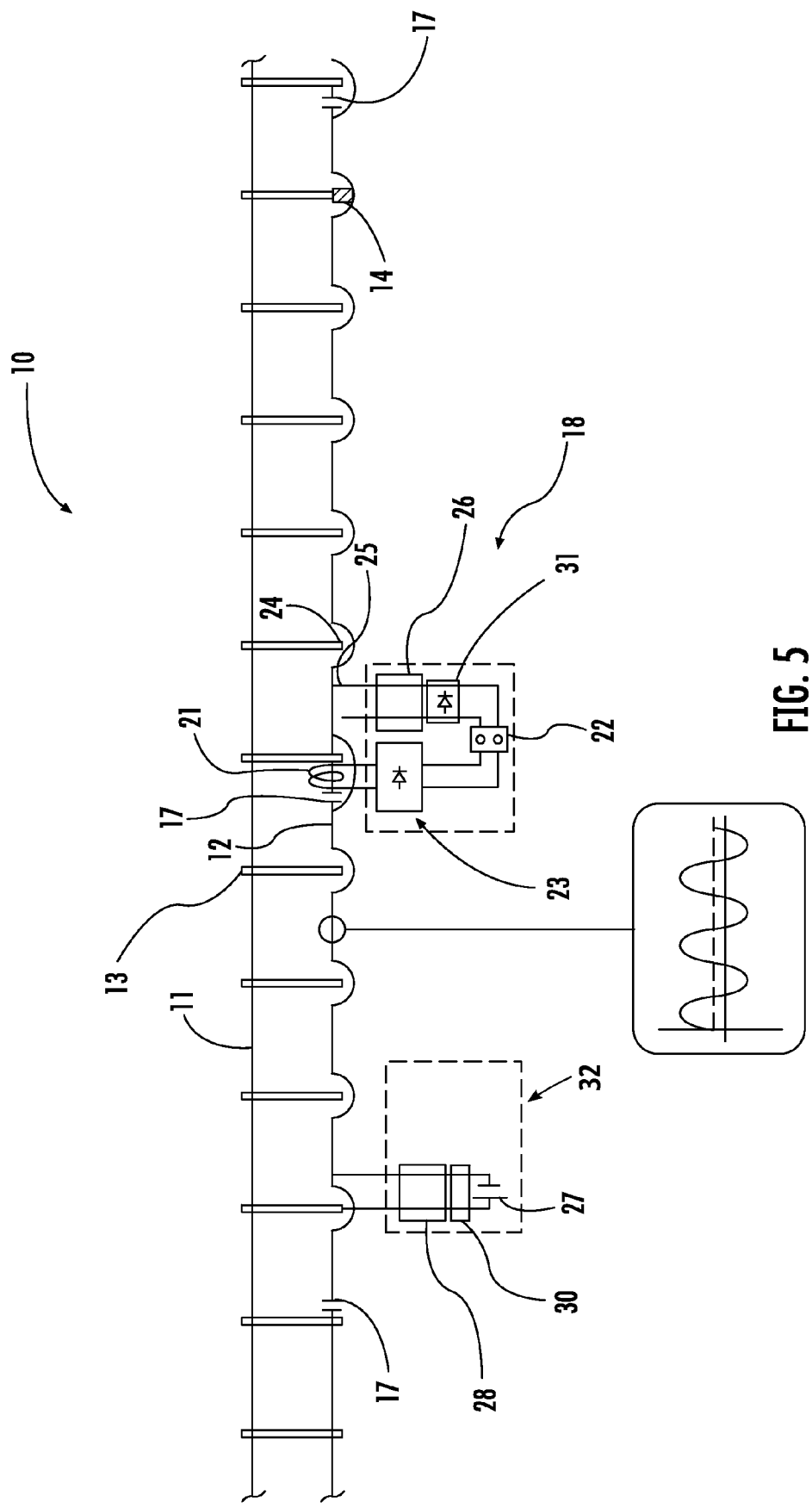
FIG. 5 is the inductive coupling diagram of FIG. 3 with the charging station positioned in yet another location.

Referring to FIGS. 4 and 5, the charging station 18 may also be positioned at different locations along the shield wire 12. For example, the charging station 18 may be positioned prior to the capacitor 17, FIG. 4, or the charging station 18 may be positioned between the capacitor 17 and the structure 13. It should also be appreciated that the charging station does not have to be next to one of the capacitors 17 on wire 12.

Figure 6:
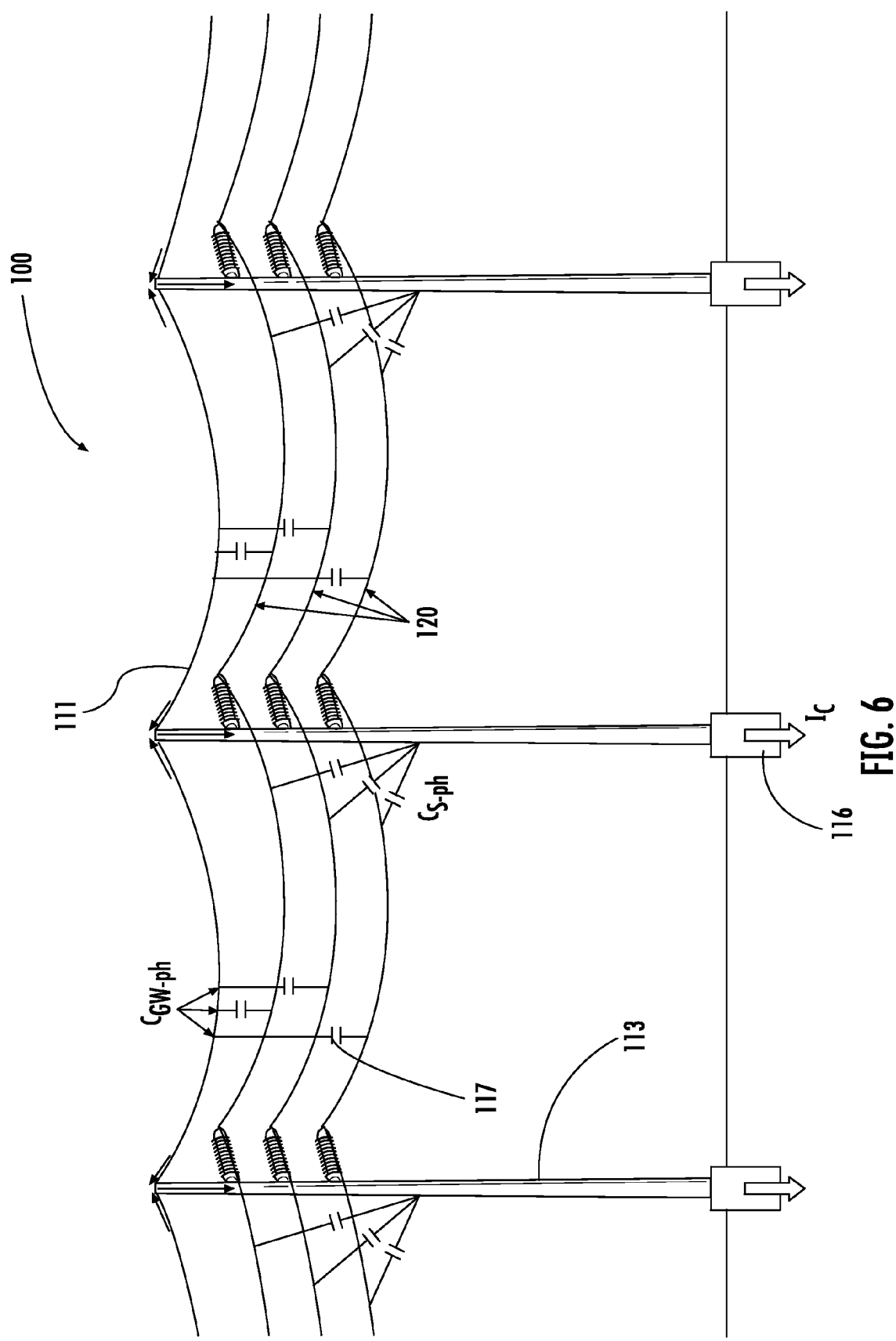
FIG. 6 shows an apparatus and method for harvesting power using capacitive coupling from an overhead transmission conductor according to an embodiment of the invention.

As shown generally at 100 in FIG. 6, power harvesting may also be done using capacitive coupling. In this instance, capacitors 117 are used to interconnect an overhead ground wire 111 to phase conductors 120 and to interconnect the phase conductors 120 with the structures 113.

The foregoing has described an apparatus and method for harvesting power from an overhead power transmission conductor. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. An apparatus adapted to harvest power from an overhead transmission conductor that is supported by a plurality of spaced-apart structures that are grounded to the earth, and to provide a DC voltage for charging a battery, comprising:
   (a) a first shield wire extending between and electrically bonded to the structures;
   (b) a second shield wire extending between and electrically isolated from the structures, wherein the first shield wire, second shield wire, structure, and earth form a loop into which induced currents flow in response to AC current flowing in the overhead transmission conductor; and
   (c) a charging station electrically connected to the second shield wire and adapted to convert induced currents flowing along the second shield wire into a DC voltage for charging a battery of the charging station.

2. The apparatus according to claim 1, wherein the second shield wire is terminated at opposing ends by a capacitor to create an insulated charging section.

3. The apparatus according to claim 1, wherein the battery of the charging station includes a first terminal bonded to the structure and a second terminal of the battery bonded to the second shield wire.

4. The apparatus according to claim 3, wherein the charging station includes:
   (a) a 60 Hz blocking filter positioned between the battery and the structure to prevent 60 Hz currents from flowing into the battery of the charging station; and
   (b) a current transformer and associated power electronics to electrically connect the charging station to the second shield wire and extract the induced currents flowing through the second shield wire and charge the battery.

5. The apparatus according to claim 2, wherein the charging station is used to charge batteries of an inspection device positioned along the charging section of the second shield wire.

6. The apparatus according to claim 5, wherein the battery of the charging station energizes the charging section of the second shield wire with a DC voltage, thereby creating a DC offset along the charging section for use in charging batteries of the inspection device.

7. The apparatus according to claim 4, wherein the charging station further includes a diode positioned between the battery and the 60 Hz blocking filter to prevent the charging station from charging another charging station positioned on the second shield wire.

8. A method of harvesting power from an overhead transmission conductor that is supported by a plurality of spaced-apart structures that are grounded to the earth, comprising the steps of:
   (a) providing an apparatus adapted to harvest power from the overhead transmission conductor, having:
      (i) a first shield wire extending between and electrically bonded to the structures;
      (ii) a second shield wire extending between and electrically isolated from the structures; and
      (iii) a charging station electrically connected to the second shield wire;
   (b) forming an induced current loop using the first shield wire, second shield wire, grounded structure, and earth to allow induced currents created by a magnetic field generated by AC current flowing in the overhead transmission conductor to flow therein; and
   (c) using the charging station to convert the induced currents flowing through the second shield wire into a DC voltage for charging a battery of the charging station.

9. The method according to claim 8, wherein the apparatus further includes capacitors positioned at opposing ends of the second shield wire to create an insulated charging section.

10. The method according to claim 8, further including the step of electrically connecting a first terminal of the battery to the structure and a second terminal of the battery to the second shield wire.

11. A method of harvesting power from an overhead transmission conductor that is supported by a plurality of spaced-apart structures that are grounded to the earth, and using the harvested power to charge a battery of an inspection device, comprising the steps of:
   (a) providing an apparatus adapted to harvest power from the overhead transmission conductor, having:
      (i) a first shield wire extending between and electrically bonded to the structures;
      (ii) a second shield wire extending between and electrically isolated from the structures; and
      (iii) a charging station electrically connected to the second shield wire;
   (b) forming an induced current loop using the first shield wire, second shield wire, grounded structures, and earth to allow induced currents created by a magnetic field generated by AC current flowing in the overhead transmission conductor to flow therein;
   (c) using the charging station to convert the induced currents flowing through the second shield wire into a DC voltage for charging a battery of the charging station; and
   (d) using the battery of the charging station to energize the second shield wire with a DC voltage for charging the battery of the inspection device.

12. The method according to claim 11, wherein the inspection device is a robot positioned on the second shield wire.

13. The method according to claim 11, further including the step of electrically connecting a first terminal of the battery of the charging station to a first one of the structures and a second terminal of the battery of the charging station to the second shield wire.

14. The method according to claim 11, further including the step of electrically connecting a first terminal of the battery of the inspection device to a second one of the structures and a second terminal of the battery of the inspection device to the second shield wire.

15. The method according to claim 11, wherein the inspection device further includes a DC converter to convert the DC voltage on the second shield wire at the inspection device to a pre-determined charging voltage for charging the battery of the inspection device.

16. The method according to claim 11, wherein the apparatus further includes capacitors positioned at opposing ends of the second shield wire to create an insulated charging section, and wherein the inspection device is positioned on the second shield wire within the charging section.

* * * * *